UNITED STATES PATENT OFFICE.

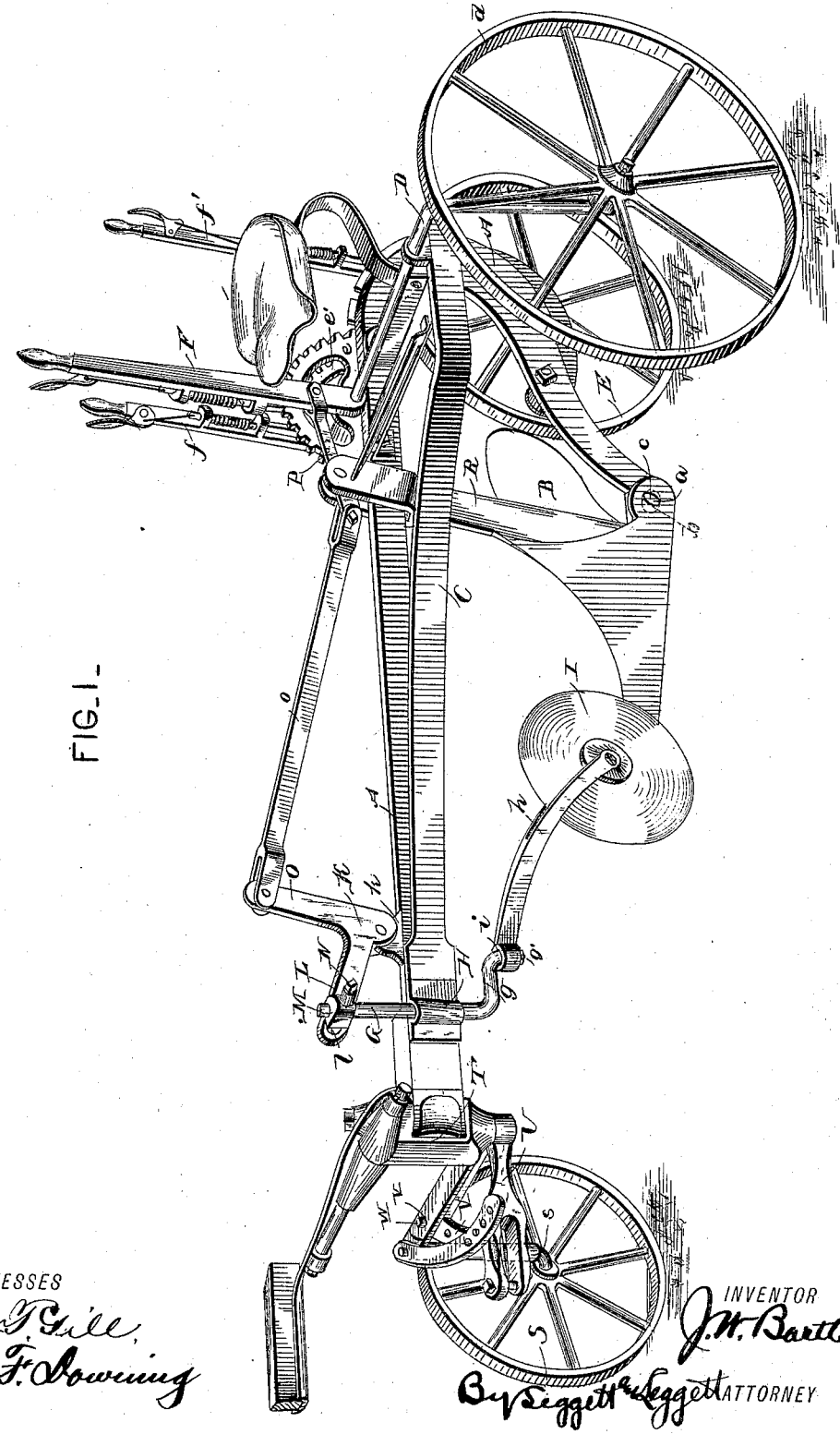

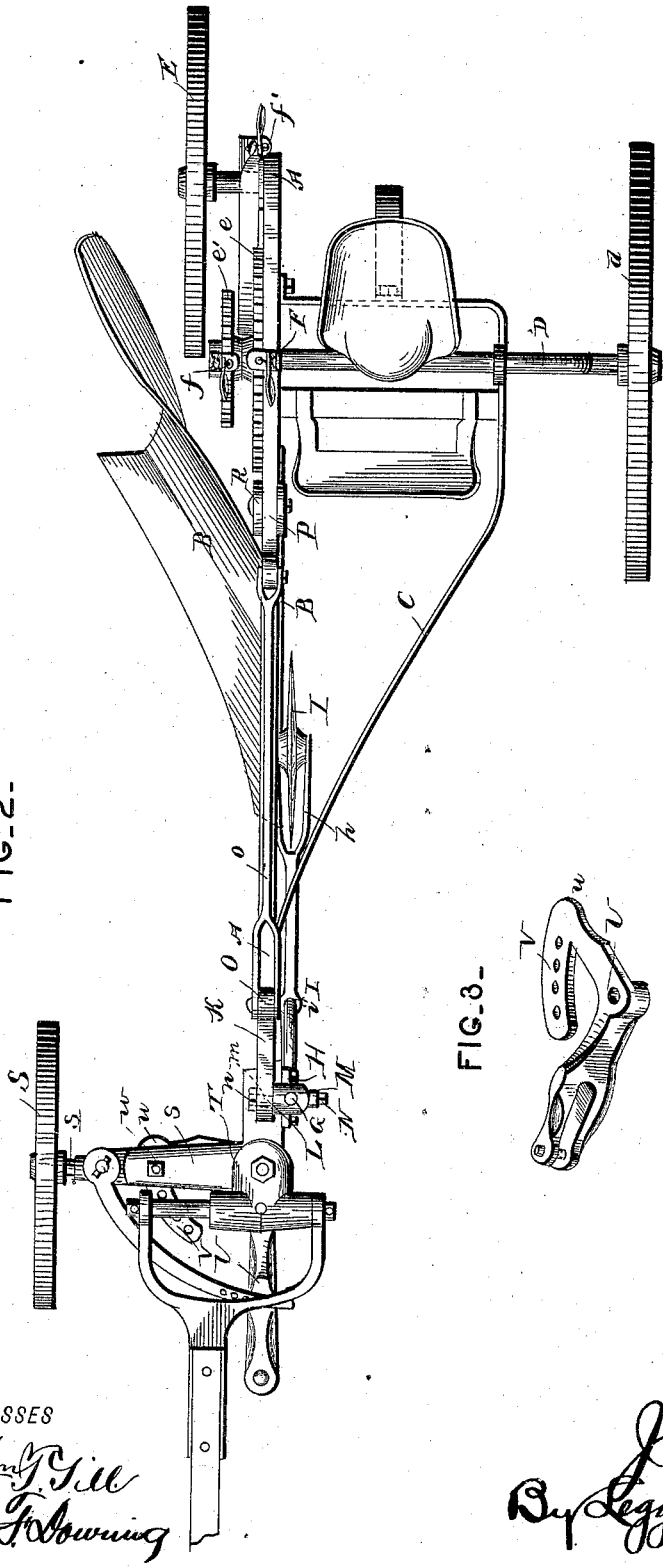

JOHN W. BARTLETT, OF MOLINE, ILLINOIS.

WHEEL-PLOW.

SPECIFICATION forming part of Letters Patent No. 319,441, dated June 9, 1885.

Application filed October 7, 1884. (No model.)

*To all whom it may concern:*

Be it known that I, JOHN W. BARTLETT, of Moline, in the county of Rock Island and State of Illinois, have invented certain new and useful Improvements in Wheel-Plows; and I do hereby declare the following to be a full, clear, and exact description of the invention, such as will enable others skilled in the art to which it appertains to make and use the same.

My invention relates to an improvement in wheel-plows, the object of the same being to provide improved mechanism for attaching a plow and colter to the beam, and for attaching the colter and plow-standards to an operating-lever, whereby the colter and plow-point may be simultaneously raised and lowered, a further object being to provide an improved device for adjusting the relative positions of the clevis and front furrow-wheel, whereby the breadth of cut of colter and plow is regulated.

With these ends in view my invention consists in certain features of construction and combinations of parts, as will be hereinafter described, and pointed out in the claims.

In the accompanying drawings, Figure 1 is a view in perspective of a wheel-plow embodying my improvements in position for use. Fig. 2 is a plan view, and Fig. 3 is a detached view, of the clevis and perforated sector-arm.

A represents the plow-beam, which curves downwardly and forwardly at the rear of the plow B. The heel of the plow is pivotally secured to the beam A at a point, a, located at a short distance from the end, the beam extending forwardly from this point a, and resting in contact with the foot of the standard. The slot b in the beam, through which the pivotal bolt c passes is somewhat elongated to allow the plow a free rocking motion on the bolt when it is out of furrow, and to allow the beam to shift forward and bear against the standard when the plow is in furrow, thereby applying the power at a point near the center of resistance.

The auxilary frame C, the crank-axle D, carrying the land-wheel d, the furrow-wheel E, sector-bars e and e', and operating-levers F, f, and f', and the front furrow-wheel, S, axle s, and fifth-wheel T are constructed and arranged in a manner fully set forth in an application filed by me April 11, 1884, Serial No. 127,479, and now awaiting issue.

A colter-standard, G, crank-shaped at its lower end, g, to cause the colter to lead truly, is secured to the side of the beam A in a vertical socket, H, in which it is allowed a sliding motion. The colter-fork h, having the colter I journaled in its lower end, is provided with a vertical socket, i, in its upper end, which fits loosely on the end of the crank g, and is secured thereon by a pin, g', or any other suitable means.

An angle-bar or bell-crank lever, K, is pivotally secured to a lug, k, on the beam A. The horizontal arm L of the angle-bar extends forwardly a little beyond the standard G, and is provided with an elongated closed slot, l, which loosely receives a stud, m, and allows the same to move laterally therein as the arm L is raised. The stud m is formed integral with or rigidly secured to an adjustable collar, M, which fits on the standard G, and is secured thereto by means of a set-screw, N. The stud m projects through the slot l, and is threaded to receive a nut, n, by which it is secured in the slot.

The upright arm O of the angle-bar is connected with the front end of a link or bar, P, by a rod or bar, o, the latter being preferably bifurcated at each end, and adapted to embrace the ends of the arm O and link P, to which it is pivoted. The link or bar P is pivotally secured to the plow-standard R and operating-lever F, as shown.

By the above construction it will be readily observed that when the lever F is thrown back the plow-standard and upper arm of the angle-bar will be drawn back and the plow-point and colter simultaneously raised, and when the lever F is thrown forward the plow-point and colter will be simultaneously lowered.

For the purpose of rendering the lateral adjustment of the clevis U with relation to the axle s accurate and stable, I have provided the rear end of the clevis with an arm, u, formed integral therewith, and running at right angles thereto. The end of the arm u is provided with a perforated sector-bar, V. A perforation, v, in the crank-axle s registers with the perforations in the bar V as the clevis is swung to the right or left, and receives a bolt, w, which locks the bar V to s, and thereby retains the clevis firmly in any required horizontal angular adjustment. By this adjustment of the clevis the colter and plow are caused to cut a broader or narrower furrow, as may be desired.

I make no broad claim in this application to a colter and plow adapted to be vertically adjusted simultaneously, as this broad principle forms the subject-matter of my application numbered 138,155, filed prior to the filing of this application.

It is evident that slight changes may be made in the form and construction of the several parts above described without departing from the spirit and scope of my invention; hence I do not wish to limit myself strictly to the construction herein set forth; but, Having fully described my invention, what I claim as new, and desire to secure by Letters Patent, is—

1. In a wheel-plow, the combination, with a beam, a plow adjustably secured to said bearing, a lever, F, for adjusting the plow, and a sector, of a colter, a vertically-movable colter-standard, a bell-crank lever pivoted to the plow beam or frame and connected at one end to the colter-standard, and devices connecting the other end of the bell-crank lever to the lever F, substantially as set forth.

2. The combination, with a plow-beam, plow, and a leading furrow-wheel supporting the forward end of the beam, of a clevis provided with a perforated sector-bar formed integral therewith, and devices for locking the said sector-arm to the furrow-wheel axle in horizontal angular adjustment, substantially as set forth.

3. The combination, with a plow-beam, plow, and a leading furrow-wheel supporting the forward end of the beam, of a clevis pivoted on the king-bolt, and provided with an arm adapted to rest in contact with the under side of the furrow-wheel axle, and with a perforated sector-bar formed integral with the arm and clevis, and a bolt passing through the furrow-wheel axle and one of the perforations in the sector-bar, whereby the clevis is locked in any desired horizontal angular adjustment, for the purpose substantially as set forth.

In testimony whereof I have signed this specification in the presence of two subscribing witnesses.

JOHN W. BARTLETT.

Witnesses:
JOHN S. GILLMORE,
W. E. TOLLES.